Sept. 23, 1958 J. DAVID 2,852,882

DRAWER CABINET TYPE TELEPHONE STAND

Filed Dec. 31, 1956

INVENTOR,
Johnnie David.
BY
[signature]
Attorney 2,852,882
Patented Sept. 23, 1958

2,852,882

DRAWER CABINET TYPE TELEPHONE STAND

Johnnie David, Los Angeles, Calif.

Application December 31, 1956, Serial No. 631,605
5 Claims. (Cl. 45—.5)

This invention relates to a stand or cabinet adapted to have a telephone instrument supported on it and to be attached to the instrument and moved about with it.

The stand or cabinet is of the same size as the base of the telephone and is shallow and contains a drawer for containing a memorandum pad and pencils and the like so that they are always with the telephone and readily available. The utility of the device is that the memorandum pad and pencil are always available and remain with the telephone since the stand or cabinet is attached to the base of the phone by spring clips or comparable means. The drawer in the stand or cabinet is arranged to open automatically by one merely touching a finger panel or latch at the end of the stand and close to the telephone dial so that the memorandum pad and pencil can be reached with the maximum of ease and facility.

The object of the invention as outlined is to provide such a telephone stand or cabinet providing for assurance that there is always a memorandum pad and pencil with or near the telephone and for the maximum of ease in obtaining access to the memorandum pad and pencil.

A further object of the invention is to provide a drawer cabinet with automatic opening means for the drawer and improved latch control means for the drawer.

Further objects and advantages of the invention will become apparent from the following detailed description and annexed drawings wherein.

Figures 1, 2, 3, 4, 5:
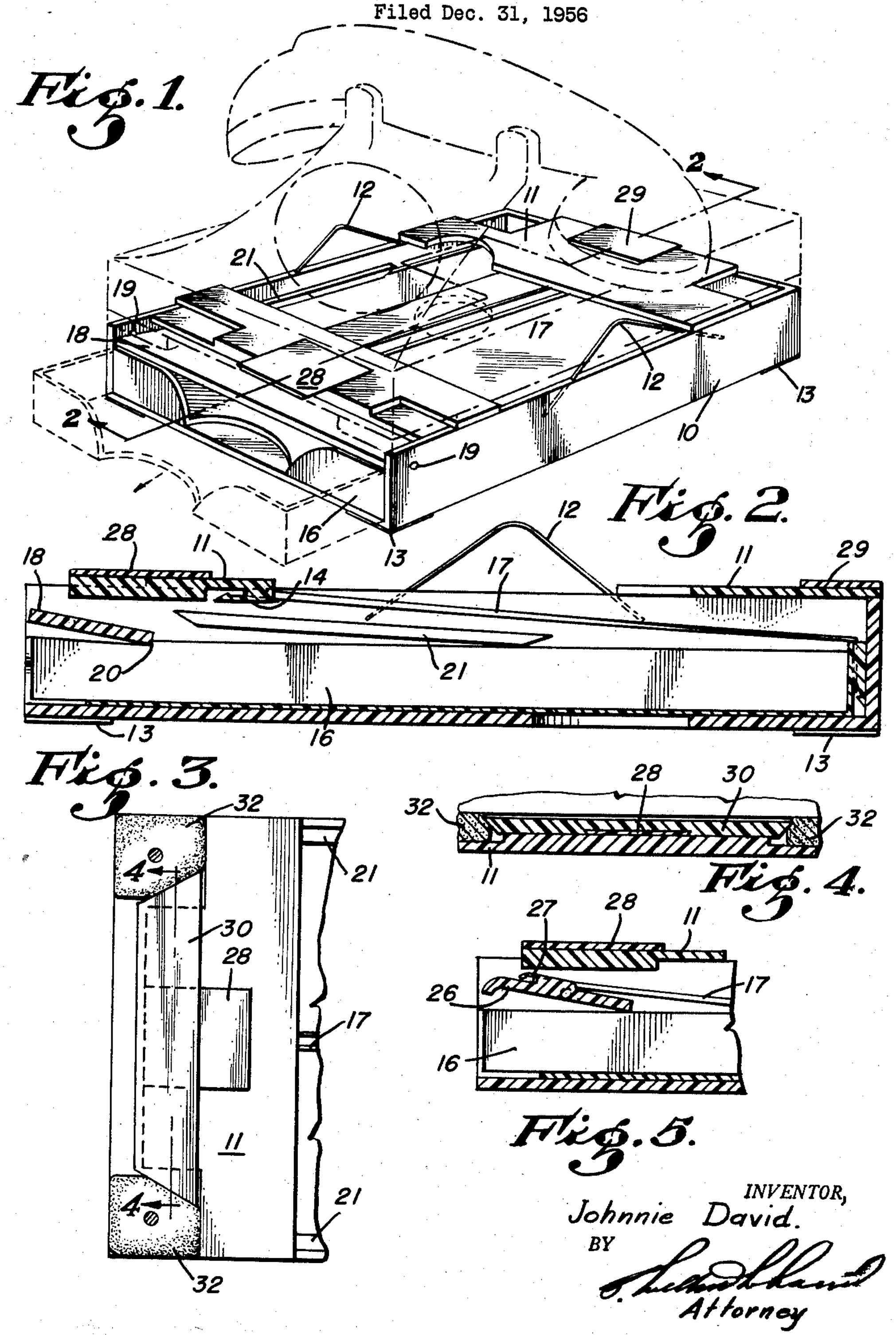
Fig. 1 is a perspective view of the stand or cabinet of the invention.
Fig. 2 is a cross-sectional view of the device of Fig. 1 taken along line 2—2.
Fig. 3 is a detail view of the additional means for attaching the stand to the telephone.
Fig. 4 is a sectional view of the device of Fig. 3 taken along line 4—4.
Fig. 5 is a detail view of a modified form of the invention.

Referring now more particularly to the drawings, the stand or cabinet is of the same size as the base of the telephone and is relatively shallow in depth. The stand has vertical side walls as shown at 10 and top panels 11 as shown. It may preferably be made of thin plastic sheet material, for example, and it is attachable to the base of the telephone by U-shaped spring clip members 12 which frictionally engage the base of the telephone so that if the telephone is picked up the stand or cabinet remains with it. Alternative means of attaching the stand to the telephone are provided which will be described presently.

The stand or cabinet may have feet as shown at 13 if desired.

Slidably mounted or disposed within the stand or cabinet is a drawer 16 which slides outwardly from the stand or cabinet endwise from that end corresponding to the side of the telephone which has the dial. The sliding drawer is adapted to contain such utensils as memorandum pads, pencils and the like.

The drawer slides under two ribs 21 attached to the inside of the side walls of the cabinet at an angle, as shown. These ribs limit tilting of the drawer when it is open.

The drawer is arranged to open automatically when a finger latch is manipulated. To provide this purpose, there is attached to the rear of the drawer a rubber band 17, the other end of which is attached to a hook 20 formed underneath the panel 11 at the front of the stand or cabinet. When the drawer is pushed in, the rubber band is stretched and is placed under tension. The drawer is normally latched in closed position and when unlatched, the rubber band causes the drawer to move out to open or partly open position.

To release the drawer and allow it to open with the maximum of ease and convenience, there is provided a latch member at the end of the stand or cabinet close to the base of the telephone and near to the dial. This latch comprises a rectangular panel member 18 which is mounted on pivots 19 so that it can pivot or tilt about a transverse axis. When the drawer is closed, the panel 18 is normally in the position shown slightly rotated about its pivots so that its inner edges engage or rest in notches or detents 20 formed in the upper edges of the sides of drawer 16. For opening the drawer the panel 18 need only be engaged at any point along its length by the operator's finger for tilting it and its inner edges will be lifted out of the notches in the drawer releasing the drawer for automatic opening. Thus, when an important telephone call is being made or received, the operator can almost unfailingly have access to the memorandum pad and pencil with the maximum of ease, merely by touching the finger panel 18.

After use and the memorandum pad and pencil are returned to the drawer it may simply be pushed in and the latch panel 18 will automatically engage the drawer with the rubber band stretched ready for the next use.

The invention provides a telephone stand or cabinet adapted for the utilitarian purpose of providing assurance of maximum ease and facility for always having access to memorandum pad and pencil in connection with the use of the telephone.

Referring now to Fig. 5 of the drawings, there is shown a modified form of latching the drawer. In this form of the invention, the latch control of the drawer is slightly different and makes it possible to latch the drawer in any degree of extended position.

In the present form of the invention the finger panel or latch member is identified by the numeral 26. It is pivotally mounted on the lateral trunnions as in the previous modification, the latch member occupying a position at the end of the stand or cabinet overlying the end of the drawer when it is in closed position. In the present modification, the resilient member, that is, the rubber band 17, is not directly attached to the stand but it is attached to the finger panel or latch member 26. On its upper side, the latch member 26 has a hook 27 to which the rubber band 17 is attached. The hook member 27 is in a position forwardly of the axis about which the latch member 26 pivots so that a torque is applied normally rotating the latch member 26 so that its inner edge is caused to bear upon the top edges of the sides of the drawer 16 with a degree of friction depending upon the stress in the rubber band 17. This stress is sufficient so that whenever the finger pressure is released on the latch member 26 in any partly extended position of the drawer 16, the rubber band will rotate the latch member 26 in a direction to cause its inner edges to bear against the top edges of the sides of the drawer 16 with sufficient frictional force to hold the drawer in that position. If finger pressure is applied to the latch member 26 to rotate it against the force of the rubber band, however, this frictional force will be released and the rubber band will then complete the outward movement of the drawer 16. Thus, in the present modification the latch is not simply a gravity operated latch cooperating with notches in the drawer but rather in the present modification, the rubber band 17 or comparable resilient member serves the dual purpose of automatically moving the drawer outwardly and providing for bias on the latch member. That is, the latch is urged into latching position or engaging position against the drawer at all times except when it is manually rotated in a direction to release the frictional engagement or pressure. The latch member or finger panel is similar in shape to the previous embodiment, being a rectangular panel at the end of the stand or cabinet directly overlying the end of the drawer when it is closed and being in close proximity to the telephone dial. The arrangement provides for the maximum of ease on the part of the operator in bringing about opening of the drawer and access to the memorandum pad and pencil in the drawer.

In addition to the spring clips to attach the stand to the base of the telephone, alternative means are provided whereby the stand may be attached by way of wedge members which wedge between the feet on the base of the telephone. Thus, the stand is adapted for attachment to commercial or domestic telephones having different size bases.

For this purpose there are attached to the top plate or panel 11 of the stand rectangular blocks 28 and 29 which are midway between sides of the stand (see Figs. 3 and 4). These may be made of plastic material of the same thickness as the stand itself and are bevelled as shown. Cooperating with these blocks are attaching members 30 having a central groove in them shaped to tightly dovetail with the blocks 28 and 29. The ends of these members are slanted to form a wedge shaped device as shown and these members are adapted for fitting between the feet at the base of the telephone in tight wedging engagement. The telephone itself normally has rubber or fibre feet at its corners, as indicated at 32, and the members 30 at each end of the telephone stand are adapted to wedge between the two feet at one end of the telephone base. When the parts are so attached, the telephone and the stand are assembled so that if the telephone is picked up the stand is carried with it.

The invention provides for the maximum of facility and ease of access to pencil and paper in connection with the telephone and these articles are always available directly in connection with the telephone and if the telephone is moved, they are carried with the telephone without any additional attention or effort on the part of the operator.

The foregoing disclosure is representative of preferred forms of my invention. It is understood that various modifications and alternatives may be adopted by those skilled in the art without departing from the spirit and scope of the invention, and it is accordingly intended that the disclosure be interpreted as illustrative rather than limiting upon the invention.

I claim:

1. In a cabinet type stand adapted to have a telephone instrument mounted thereon in combination: means comprising a shallow drawer cabinet having means to engage the base of a telephone instrument to hold the cabinet to the instrument; a drawer in the cabinet opening in a direction corresponding to the side of the telephone having the dial; resilient means engaging the drawer and positioned to be stressed when the drawer is in closed position; and means comprising a latch for retaining the drawer in closed position, said latch comprising a finger panel mounted on transverse pivots over the end of the drawer when it is in closed position near the telephone dial, the latch panel normally having engagement with the drawer when the drawer is closed to hold it in closed position, whereby the panel releases the drawer when the panel is tilted on its pivots.

2. In a structure of the type adapted for use as a telephone stand comprising a cabinet having a drawer therein; means for opening the drawer comprising resilient means positioned to be stressed when the drawer is in closed position; the improvement comprising latch means for controlling the automatic opening of the drawer, said latch comprising a finger panel closely overlying the end of the drawer when it is in closed position near the telephone dial, the sides of the drawer having notches therein adjacent said panel, said panel being mounted to pivot about a transverse axis and normally having edge portions engaging with the said notches to hold it in closed position whereby upon tilting of the panel about its axis it is disengaged from the drawer allowing the drawer to automatically open.

3. In a drawer cabinet type telephone stand in combination: means comprising a rectilinear cabinet of a size corresponding to the base of a telephone; means associated with the cabinet for attaching it to the base of the telephone, said cabinet having a drawer therein; means comprising a resilient member for automatically moving the drawer to open position; means comprising a manual member for causing the drawer to open and for restraining it in a partly open position, said member comprising a finger panel pivoted to operate about a transverse axis extending between the side walls of the cabinet and overlying the end of the drawer near the telephone dial when the drawer is in closed position, said resilient member having attachment to said finger panel in a position to normally rotate said panel in a direction so that it engages the top edges of the sides of the drawer, and said panel having sufficient frictional engagement therewith to hold the drawer against opening movement whereby the drawer can be caused to automatically move to any degree of opening by manipulating the said finger panel.

4. In a cabinet of the type described in combination: means comprising a rectilinear cabinet having a drawer therein; means comprising a latch member pivotally mounted in the cabinet and overlying the end of the drawer when it is in closed position; means comprising a resilient member attached to the latch member at one end and to the drawer at the other end for causing the drawer to move out when it is free to do so, said resilient member being attached to the latch member at a point to normally urge the latch member about its axis so as to bring said latch member into engagement with the drawer to latch the drawer against movement, whereby the resilient member opens the drawer and automatically operates the latch when the drawer is closed.

5. In a drawer cabinet type telephone stand in combination: means comprising a rectilinear cabinet of a size corresponding to the base of a telephone, said cabinet having a drawer therein; means overlying the drawer comprising a resilient member attached at one end to the cabinet and at the other end to the inner end of the drawer for moving the drawer to open position; means comprising a pair of guide ribs formed on the insides of the walls of the cabinet and lying over the sides of the drawer, said guide ribs having an upward slant towards the front of the cabinet to limit tilting of the drawer in open position; means comprising a latch for retaining the drawer in closed position, said latch comprising a rectangular finer panel mounted on transverse pivots over the end of the drawer when it is in closed position; the side walls of the drawer having notches near one end forming square shoulders; the finger panel being engageable with said square shoulders when the drawer is in closed position to hold it in closed position against the force of said resilient means whereby the finger panel can be tilted by pressure anywhere along its length to release the drawer for opening.

(References on following page)

References Cited in the file of this patent

UNITED STATES PATENTS

| | | |
|---|---|---|
| 1,213,185 | Gee | Jan. 23, 1917 |
| 1,363,524 | McNamara | Dec. 28, 1920 |
| 1,425,559 | Wampach et al. | Aug. 15, 1922 |
| 1,434,265 | Rosine et al. | Oct. 31, 1922 |
| 1,659,164 | Sanders | Feb. 14, 1928 |
| 1,767,003 | Kapland et al. | June 24, 1930 |
| 2,148,055 | Blumenthal | Feb. 21, 1939 |
| 2,582,562 | Rice | Jan. 15, 1952 |
| 2,586,543 | Kennedy | Feb. 19, 1952 |
| 2,701,932 | Hyman | Feb. 15, 1955 |
| 2,731,763 | Domberger | Jan. 24, 1956 |
| 2,778,151 | Hickerson | Jan. 22, 1957 |